US012703662B2

(12) United States Patent
Myrtja et al.

(10) Patent No.: US 12,703,662 B2
(45) Date of Patent: Aug. 11, 2026

(54) BINDER COMPOSITION COMPRISING FINE FILLER AND FINE GROUND GRANULATED BLAST FURNACE SLAG

(71) Applicants: ECOCEM MATERIALS LIMITED, Dublin (IE); ECOLE NORMALE SUPERIEURE PARIS-SACLAY, Gif sur Yvette (FR); CENTRE NATIONAL DE LA RECHERCHE SCIENTIFIQUE—CNRS-, Paris (FR); Institut National des Sciences Appliquées de Toulouse, Toulouse (FR); UNIVERSITE PAUL SABATIER TOULOUSE III, Toulouse (FR)

(72) Inventors: Erisa Myrtja, Paris (FR); Artur Kiiashko, Paris (FR); Laurent Frouin, Paris (FR); Martin Cyr, Toulouse Cedex (FR); Mohend Chaouche, Gif sur Yvette (FR)

(73) Assignees: ECOCEM MATERIALS LIMITED, Eastpoint Dublin (IE); ECOLE NORMALE SUPRERIEURE PARIS-SACLAY, Gif sur Yvette (FR); ENTRE NATIONAL DE LA RECHERCHE SCIENTIFIQUE—CNRS, Paris (FR); INSTITUT NATIONAL DES SCIENCES APPLIQUEÉES DE TOULOUSE, Toulouse (FR); UNIVERSITE PAUL SABTIER TOULOUSE III, Toulouse (FR)

( * ) Notice: Subject to any disclaimer, the term of this patent is extended or adjusted under 35 U.S.C. 154(b) by 399 days.

(21) Appl. No.: 18/286,613

(22) PCT Filed: Apr. 29, 2022

(86) PCT No.: PCT/EP2022/061570
§ 371 (c)(1),
(2) Date: Oct. 12, 2023

(87) PCT Pub. No.: WO2022/229433
PCT Pub. Date: Nov. 3, 2022

(65) Prior Publication Data

US 2024/0190770 A1 Jun. 13, 2024

(30) Foreign Application Priority Data

Apr. 30, 2021 (EP) .................................... 21305566

(51) Int. Cl.
*C04B 28/08* (2006.01)
*C04B 40/06* (2006.01)

(52) U.S. Cl.
CPC .......... *C04B 28/08* (2013.01); *C04B 40/0625* (2013.01); *C04B 2201/50* (2013.01)

(58) Field of Classification Search
CPC . C04B 28/08; C04B 40/0625; C04B 2201/50; C04B 2111/00482; C04B 2111/00672; C04B 7/527; C04B 40/0608; Y02W 30/91
See application file for complete search history.

(56) References Cited

U.S. PATENT DOCUMENTS

| | | | | |
|---|---|---|---|---|
| 8,932,402 | B2 * | 1/2015 | Hesselbarth | C04B 7/1535 |
| 9,656,918 | B2 * | 5/2017 | Kuryatnyk | C04B 28/14 |
| 9,890,079 | B2 * | 2/2018 | Raz | C04B 7/243 |
| 10,737,980 | B2 | 8/2020 | Guynn | |
| 2007/0068425 | A1 | 3/2007 | Pimentel et al. | |
| 2016/0122246 | A1 | 5/2016 | Kuryatnyk et al. | |
| 2018/0044236 | A1 | 2/2018 | Ball et al. | |
| 2024/0190771 | A1 * | 6/2024 | Frouin | C04B 22/147 |

FOREIGN PATENT DOCUMENTS

| | | | |
|---|---|---|---|
| AR | 030622 | A1 | 8/2003 |
| AR | 047224 | A1 | 1/2006 |
| AR | 099799 | A1 | 8/2016 |
| CN | 104640823 | A | 5/2015 |
| CN | 111263739 | A | 6/2020 |
| EP | 3 015 438 | | 5/2016 |

(Continued)

OTHER PUBLICATIONS

Japanese Office Action dated Mar. 10, 2026 issued in corresponding application 2023-566768.

*Primary Examiner* — Anthony J Green

(74) *Attorney, Agent, or Firm* — Millen, White, Zelano & Branigan, P.C.; Christopher W. Brody

(57) ABSTRACT

A binder composition in dry weight percentage comprises a) between 1% and 30% of at least one lime source, b) between 5% and 75% of ground granulated blast furnace slag, (c) between 20% and 90% of at least one filler, (d) between 0.1% and 5% of $SO_3^-$, e) between 0.1% and 1% of at least one water reducer polymer, f) between 0% and 2%, relative to the total weight of components a, b and c, of at least one activator different from d, the weights of d, e, f relative to the total weight of components a, b, c, said ground granulated blast furnace slag and the filler each being a mixture of two differently sized particles, the different sizes based on $d_{50}$ and range of between 1 μm and 5 μm and >5 μm for the slag and between 0.05 μm and <8 μm and ≥8 μm and <200 μm for the filler.

12 Claims, No Drawings

(56) References Cited

FOREIGN PATENT DOCUMENTS

| | | | |
|---|---|---|---|
| JP | H08268744 | A | 10/1996 |
| JP | 2007269536 | A | 10/2007 |
| JP | 2011006321 | A | 1/2011 |
| JP | 2011079990 | A | 4/2011 |
| JP | 2014148434 | A | 8/2014 |
| WO | 2011027891 | A1 | 3/2011 |
| WO | 2011/055063 | | 5/2011 |
| WO | 2015143374 | A1 | 9/2015 |
| WO | 2017/198930 | | 11/2017 |
| WO | 2019/110134 | | 6/2019 |
| WO | 2020/070093 | | 4/2020 |

* cited by examiner

BINDER COMPOSITION COMPRISING FINE FILLER AND FINE GROUND GRANULATED BLAST FURNACE SLAG

TECHNICAL FIELD

This disclosure pertains to the field of binder composition for preparing concrete or industrial mortars. The technical field of the invention relates to hydraulic mineral binders including at least one slag, for instance a Ground Granulated Blast furnace Slag (GGBS or slag), which are used in compositions able to set and harden, such as mortar or concrete compositions.

More particularly, the invention relates to binders and compositions able to set and harden for the building industry, which include at least one slag as hydraulic binder, a part of which being ultrafine, as well as and fine limestone filler.

The invention concerns also the methods of preparation of these slag-based binders, of these dry or wet compositions able to set and harden.

The building applications made of the set and hardened products obtained from these compositions are also in the field of the invention.

BACKGROUND ART

Portland cement production has a strong and negative impact on the environment due to the emissions of large quantities of carbon dioxide. The production of cement inherently generates $CO_2$ during the calcination of the raw materials at very high temperature (1450° C.) in a kiln through decarbonation of the limestone (Eq. (1)):

$$CaCO_3(s) \rightarrow CaO(s) + CO_2(g) \quad \text{(Eq. (1))}$$

In addition, carbon dioxide is released as a result of the combustion of the fossil fuels needed to heat the cement kiln. By adding the additional emissions of grinding, almost one ton of $CO_2$ per ton of Portland cement is obtained. Overall, the cement industry is responsible for about 7 to 9% of the global carbon dioxide emissions.

Moreover, handling Portland cement may lead to health issues (such as allergy) due in particular to its high alkalinity (pH higher than 13). In addition, hazardous elements as hexavalent Chromium (Cr (VI)) may be released upon kneading, which is also unhealthy for the workers when it gets in contact with the skin. Although Cr (VI) reducing agents (as ferrous sulfate) are normally included in the cement powder, their efficiency is limited in time. Building workers, in particular those in the third world, are not expected to often check the deadline related to such treatments.

Most current research on new binders aims to replace cement in various applications by binders with lower environmental impact. One route is through using resources without their expensive treatment, such as by-products from other industries (waste for one industry, but primary resource for others). This is the case of blast-furnace slag which is a by-product of iron industry. By grinding this product into fine powder (GGBS) one can obtain a cementitious material that can be used in partial substitution of cement or used alone by adding some chemical activators.

It is important to note that the use of a GGBS is not only environmentally-friendly but also leads to several enhanced properties when it's used to formulate mortars and concretes, such as high resistance to sulfate attack, low permeability, good resistance in a chemically aggressive environment, low heat of hydration (required in massive structures), excellent durability in general, possibility of immobilization of heavy metals or radionuclides, etc.

In this context, the invention aims at addressing at least one of the above problems and/or needs, through fulfilling at least one of the following objectives:

-O1- Providing a slag-based binder or a mortar or concrete composition including said slag-based binder, which is attractive substitute to Ordinary Portland Cement (OPC)-based compositions.

-O2- Providing a slag-based binder or a mortar or concrete composition including said slag-based binder, which is environmentally friendly.

-O3-Providing a slag-based binder or a mortar or concrete composition including said slag-based binder, which is more acceptable than OPC-based compositions, with respect to the health and safety issues.

-O4-Providing a slag based binder or a mortar or concrete composition including said slag based binder, which gives rise to dry-mortars, dry and semi-dry precast concrete and wet mortars and concrete formulations with appropriate ability to be manufactured by several ways, like vibro-compaction, spraying, trowelling, casting, etc.

-O5-Providing a slag-based binder or a mortar or concrete composition including said slag-based binder, which gives rise to wet formulations with appropriate rheological properties, i.e stable rheology (good workability) during the usual setting time (e.g. from some minutes to several hours) required by the users of said wet formulation.

-O6-Providing a slag-based binder or a mortar or concrete composition including said slag-based binder, which gives rise to a hardened material with required mechanical properties, especially an acceptable early strength (for instance 24 hours).

-O7-Providing a slag-based binder or a mortar or concrete composition including said slag-based binder, which gives rise to a hardened material with required durability.

-O8-Providing a slag-based binder or a mortar or concrete composition including said GGBS-based binder, which gives rise to a hardened material with the usually required setting time (e.g. from some minutes to several hours).

-O9-Providing a simple and cheap method of preparation of the slag-based binder or the mortar or concrete composition including said slag-based binder, which complies with at least one of the objectives -O1- to -O9-.

-O10-Providing a simple and cheap method of preparation of a wet form of the slag-based binder or a mortar or concrete composition including said slag-based binder.

-O11-Providing hardened products for the building industry including slag as at least partial binder.

SUMMARY

The above objectives are reached thanks to a binder composition comprising:

a. between 1% and 30% in dry weight of at least one lime source;

b. between 5% and 75% in dry weight of ground granulated blast furnace slag;

c. between 20% and 90% in dry weight of at least one filler;

d. between 0.1% and 5% in dry weight, relative to the total weight of components a, b and c, of $SO_3^-$;

e. between 0.1% and 1% in dry weight, relative to the total weight of components a, b and c, of at least one water reducer polymer;

f. between 0% and 2% in dry weight, relative to the total weight of components a, b and c, of at least one activator different from d.;

said ground granulated blast furnace slag being a particles mixture of:

between 10% and 100% in weight, in respect with the total weight of the ground granulated blast furnace slag, of particles having a $d_{50}$ greater than or equal to 1 μm and strictly less than 5 μm, between 0% and 90% in weight, in respect with the total weight of the ground granulated blast furnace slag, of particles having a $d_{50}$ greater than or equal to 5 μm and preferably less than 15 μm, said filler being a particles mixture of:

between 10% and 90% in weight, in respect with the total weight of the filler, of particles having a $d_{50}$ greater than or equal to 0.05 μm and strictly less than 8 μm, and between 10% and 90% in weight, in respect with the total weight of the filler, of particles having a $d_{50}$ greater than or equal to 8 μm and strictly less than 200 μm.

The invention also concerns a dry concrete composition or a dry industrial mortar composition, in particular tile adhesive, coating, assembling mortars, repair mortars, renders, technical mortars and mortars for floor covering comprising at least one aggregate and the binder composition described above.

The invention further concerns a wet concrete composition or a wet industrial mortar composition, in particular tile adhesive, coating, assembling mortars, repair mortars, renders, technical mortars and mortars for floor covering comprising at least one aggregate, the binder composition described above and water.

The invention is in addition directed to a hardened concrete composition or a hardened industrial mortar composition obtained from the wet concrete or industrial mortar composition described above.

Moreover, the invention concerns a process for preparing the wet concrete composition or the wet industrial mortar composition as described above comprising a step of mixing with water, at least one aggregate and the binder composition as described above the binder composition being prepared before the mixing step or in situ during the mixing step from at least some of the different components of the binder composition taken separately and/or under the form of premix(es).

The invention relates to a use of the binder composition as described above for improving the fresh state rheology of wet concrete composition or wet industrial mortar composition in particular tile adhesive, coating, assembling mortars, repair mortars, renders, technical mortars and mortars for floor covering.

Definitions

According to the terminology of this text, the following non limitative definitions have to be taken into consideration:

- "slag" denotes a stony by-product matter separated from metals during the smelting or refining of ore.
- "GGBS" or "GGBFS": Ground Granulated Blast Furnace Slag, which is equivalent to blast furnace slag, Granulated Blast Furnace Slag (GBFS), blast furnace water-crushed slag powder and blast furnace slag fine aggregate.
- "cement" is understood as meaning a powdery substance made for use in making mortar or concrete. It is a mineral binder, possibly free from any organic compound. It refers to any ordinary cement and it includes slag Portland blended and alkali-activated based cements.
- "binder" refers to "hydraulic binder" meaning any material that hardens just by adding water, like GGBS and cement.
- "mortar" refers to a material composed of binder(s), aggregates such as sand and other components, like admixtures.
- "concrete" refers to a material composed of binder(s), aggregates such as sand and gravel and other components, like admixtures.
- "$d_{50}$" gives the median size of the granulometric distribution of material's particles (usually in micrometres for cementation materials). It means that 50% of the particles have a size less than the specified number and 50% of the particles have a size greater than the given number. The measurement of $d_{50}$ is done by Laser diffraction analysis, also known as Laser diffraction spectroscopy, by means of Laser diffraction analyzer such as "Mastersizer 2000" and commercialized by the MALVERN company, with the humid way method.

DETAILED DESCRIPTION

The Binder Composition

The binder composition according to the invention comprises:

a. between 1% and 30% in dry weight of at least one lime source;

b. between 5% and 75% in dry weight of ground granulated blast furnace slag;

c. between 20% and 90% in dry weight of at least one filler;

d. between 0.1% and 5% in dry weight, relative to the total weight of components a, b and c, of $SO_3^-$;

e. between 0.1% and 1% in dry weight, relative to the total weight of components a, b and c, of at least one water reducer polymer;

f. between 0% and 2% in dry weight, relative to the total weight of components a, b and c, of at least one activator different from d.;

said ground granulated blast furnace slag being a particles mixture of:

between 10% and 100% in weight, in respect with the total weight of the ground granulated blast furnace slag, of particles having a $d_{50}$ greater than or equal to 1 μm and strictly less than 5 μm, between 0% and 90% in weight, in respect with the total weight of the ground granulated blast furnace slag, of particles having a $d_{50}$ greater than or equal to 5 μm and preferably less than 15 μm, said filler being a particles mixture of:

between 10% and 90% in weight, in respect with the total weight of the filler, of particles having a $d_{50}$ greater than or equal to 0.05 μm and strictly less than 8 μm, and between 10% and 90% in weight, in respect with the total weight of the filler, of particles having a $d_{50}$ greater than or equal to 8 μm and strictly less than 200 μm

The Component a

The binder composition according to the invention comprises between 1% and 30% in dry weight of a component a, which is a lime source, preferably, between 3% and 25%, more preferably between 5% and 20%.

Preferably, the lime source is Portland cement or lime, such as hydraulic lime, calcium hydroxide, slaked lime, quick lime and lime slurry.

In case the lime source is Portland cement it is advantageous that at least a portion of the same is ultrafine cement having a $d_{50}$ lower than or equal to 8 μm, preferably lower than or equal to 3.5 μm. This embodiment is advantageous since it allows obtaining increased compressive strength compared to the other embodiment.

The Component b

The binder composition according to the invention comprises between 5% and 75% in dry weight of a component b, which ground granulated blast furnace slag (GGBS) preferably, between 10% and 65%, more preferably between 15% and 50% and even more preferably between 20% and 40%.

According to the invention, at least a portion of the ground granulated blast furnace slag is ultrafine, i.e. made of particles having a do greater than or equal to 1 μm and strictly less than 5 μm.

In some embodiment, said ground granulated blast furnace slag is a particles mixture of:

- between 20% and 90% in weight, preferably between 30% and 80%, more preferably between 40% and 65% in weight, in respect with the total weight of the ground granulated blast furnace slag, of particles having a $d_{50}$ greater than or equal to 1 μm and strictly less than 5 μm,
- between 0% and 90% in weight, preferably between 20% and 70%, more preferably between 35% and 60% in weight, in respect with the total weight of the ground granulated blast furnace slag, of particles having a $d_{50}$ greater than or equal to 5 μm and preferably less than 15 μm.

The Component c

The binder composition according to the invention comprises between 20% and 90% in dry weight of a component d, which is a filler preferably, between 30% and 80%, more preferably between 40% and 70%, even more preferably between 50% and 60%.

A filler is an inorganic material finely granulated which is inert. In other words a filler is not able to react with lime or cement, in the presence of water, so as to produce hydrates.

Preferably, the filler is a limestone filler, more preferably, the filler is a natural material sourcing from stone-pit, such as calcite and its polymorphs, like aragonite or vaterite, and dolomite or precipitated calcium carbonates and mixtures thereof.

According to the invention, the filler is a particles mixture of:

- between 10% and 90% in weight, in respect with the total weight of the filler, of particles having a $d_{50}$ greater than or equal to 0.05 μm and strictly less than 8 μm, and
- between 10% and 90% in weight, in respect with the total weight of the filler, of particles having a $d_{50}$ greater than or equal to 8 μm and strictly less than 200 μm.

This filler partition, in combination with the GGBS partition, allows obtaining a technical effect of reducing the viscosity and increasing the compressive strength of the binder composition and of the concrete or industrial mortars according to the invention.

In some embodiments the filler is a particles mixture of:

- between 20% and 80%, preferably between 25% and 50%, more preferably between 30% and 40% in weight, in respect with the total weight of the filler, of particles having a $d_{50}$ greater than or equal to 0.05 μm and strictly less than 8 μm, and
- between 20% and 80%, preferably between 30% and 70%, more preferably between 40% and 65% in weight, in respect with the total weight of the filler, of particles having a $d_{60}$ greater than or equal to 8 μm and strictly less than 200 μm.

The Component d

According to the invention, the binder composition further comprises between 0.1% and 5% in dry weight, relative to the total weight of components a, b and c, of $SO_3^-$.

The content of the $SO_3^-$ is determined in respect with the distribution of components a, b and c. In other words, the dry weight percentage of the $SO_3^-$ is determined by considering that the sum of contents of components a, b and c represents 100% in dry weight.

Preferably, the $SO_3^-$ is from sodium sulfate, potassium sulfate, calcium sulfate, anhydride sulfate, recycling gypse or mixture thereof.

The Component e

According to the invention, the binder composition further comprises between 0.1% and 1% in dry weight, relative to the total weight of components a, b and c, of at least one water reducer polymer.

The content of the water reducer polymer is determined in respect with the distribution of components a, b and c. In other words, the dry weight percentage of the water reducer polymer is determined by considering that the sum of contents of components a, b and c represents 100% in dry weight.

Preferably, the water reducing polymer is selected from the group consisting of lignosulfonate polymers, melamine sulfonate polymers, naphthalene sulfonate polymers, polycarboxylic acid ether polymers, polyoxyethylene phosphonates, vinyl copolymers, and mixtures thereof.

The Component f

According to the invention, the binder composition further comprises between 0% and 2% in dry weight, relative to the total weight of components a, b and c, of at least one activator different from d.

The content of the activator different from d is determined in respect with the distribution of components a, b and c. In other words, the dry weight percentage of the activator is determined by considering that the sum of contents of components a, b and c represents 100% in dry weight.

Preferably, the activator different from d is an alkaline metal salt, preferably sodium chloride, potassium chloride, lithium chloride, sodium carbonate, potassium carbonate, lithium carbonate, calcium nitrate, sodium nitrate, potassium nitrate, lithium nitrate, sodium nitrite, potassium nitrite, lithium nitrite, calcium nitrite, sodium thiocyanate, potassium thiocyanate, lithium thiocyanate, alkanolamines such as triethanolamine (TEA), triisopropanolamine (TIPA), diethanolamine (DEA) or mixture thereof, preferably calcium nitrate.

Optional Other Components

The binder composition is advantageously enriched with one or several other components which are ingredients, notably functional additives preferably selected in the following list:

Water Retention Agent.

A water retention agent has the property to keep the water of mixing before the setting. The water is so trapped in the wet formulation paste which improves its bond. To some extent, the water is less absorbed by the support.

The water retentive agent is preferably chosen in the group comprising: modified celluloses, modified guars, modified cellulose ethers and/or guar ether and their mixes, more preferably consisting of: methylcelluloses, methylhydroxypropylcelluloses, methylhydroxyethyl-celluloses and their mixes.

Rheological Agent

The possible rheological agent (also named a "thickener") is preferably chosen in the group comprising, more preferably consisting in: starch ethers, cellulose ethers and/or gums (e.g. Welan guar xanthane, succinoglycans), modified polysaccharides-preferably among modified starch ethers-, polyvinylic alcohols, polyacrylamides, sepiolites, and their mixes.

Defoamer/Antifoams

The possible defoamer is preferably chosen in the group comprising, more preferably consisting in: polyether polyols and mixes thereof.

Biocide

The possible biocide is preferably chosen in the group comprising, more preferably consisting in: mineral oxides like zinc oxide and mixes thereof.

Pigment

The possible pigment is preferably chosen in the group comprising, more preferably consisting in: $TiO_2$, iron oxide and mixes thereof.

Flame Retardant

Flame retardant (or flame proof agent) makes it possible to increase the fire resistance and/or to shrink the speed of flame spreading of the composition.

Air-Entraining Agents

Air-entraining agents (surfactants) are advantageously chosen in the group comprising, more preferably consisting in, natural resins, sulfated or sulfonated compounds, synthetic detergents, organic fatty acids and their mixes, preferably in the group comprising, more preferably consisting in the lignosulfonates, the basic soaps of fatty acids and their mixes, and, more preferably in the group comprising, more preferably consisting in the sulfonate olefins, the sodium lauryl sulfate and their mixes.

Retarders

Retarders are advantageously chosen in the group comprising, more preferably consisting in tartric acid and its salts: sodium or potassium salts, citric acid and its salts: sodium (trisodic citrate) and their mixes.

In addition, other components may be:

Plasticizers

Fibres

Dispersion powders

Wetting agents

Polymeric resins

Complexing agents

Drying shrinkage reducing agents based on polyols.

The total content of these optional other components in the binder composition is preferably comprised between 0.001% and 10% by weight of the total weight of the binder composition.

The Dry Concrete Composition or Dry Industrial Mortar Composition

The invention also relates to dry concrete composition or dry industrial mortar composition, in particular tile adhesive, coating, assembling mortars, repair mortars, renders, technical mortars and mortars for floor covering comprising at least one aggregate and the binder composition described above. The dry concrete composition or dry industrial mortar composition may eventually contain other admixtures and additions.

According to the invention, "dry" concrete composition or "dry" industrial mortar composition refers to compositions that are in the form of powder and ready to be mixed with water. In other words, the dry concrete composition or dry industrial mortar composition of the invention may content some moisture, but it essentially contains solid components which are intended to be mixed with water before its application.

Aggregates comprise a large category of particulate material used in construction, including sands, gravels, crushed stones, slag (not-granulated), recycled concrete and geosynthetic aggregates. They serve as reinforcement to add strength to the overall composite material.

Advantageously, said dry concrete composition or dry industrial mortar composition can also include, apart from aggregates, one or several ingredients, especially functional admixtures, additions and fibres, which can be the same as the other optional component mentioned above defined in the detailed description of the binder composition.

The total content of these optional other components in the dry concrete or industrial mortar composition is preferably comprised between 0.1% and 10% by weight of the total weight of the binder composition.

The Wet Concrete Composition or Wet Industrial Mortar Composition

The invention also refers to a wet concrete composition or wet industrial mortar composition in particular tile adhesive, coating, assembling mortars, repair mortars, renders, technical mortars and mortars for floor covering comprising at least one aggregate, the binder composition described above and water.

In a specific embodiment, wet mortar compositions are so called "Ready to use" mortars. "Ready to use" mortars are used for assembling bricks or blocks on building site. They are obtained by mixing all the elements of the composition (binder, aggregates and others components) with water directly at the mixing plant. They include a set retarding agent, allowing transport and delayed use up to several days, while maintaining its rheological and hardening properties.

The Process for Preparing Wet Concrete Composition or Wet Mortar Composition

The invention also relates to a process for preparing the wet concrete composition or wet industrial mortar composition described above comprising a step of mixing with water at least one aggregate and the binder composition described above, the binder composition being prepared before the mixing step or in situ during the mixing step from at least some of the different components of the binder composition taken separately and/or under the form of premix(es).

In other words, wet concrete composition or wet industrial mortar composition could be prepared by two distinct methods.

In a first method, the binder composition is prepared, and then mixed with the at least one aggregate. The dry concrete composition or dry mortar composition is thereafter mixed with water.

In a second method, the wet concrete composition or wet industrial mortar composition is prepared by mixing in water each component of the binder composition and the aggregates.

According to the present disclosure, the term "mixing" has to be understood as any form of mixing.

In a preferred embodiment a part of the binder composition and at least a part of the water are mixed together prior to the mixing with the aggregate.

In a preferred embodiment, the process is implemented with a ratio water to binder composition comprised between 0.1 and 0.5, advantageously between 0.15 and 0.45, and more advantageously between 0.2 and 0.4.

Hardened Concrete Composition or Hardened Industrial Mortar Composition

The present invention also refers to hardened concrete composition or hardened industrial mortar composition obtained from the wet concrete composition or the wet industrial mortar composition described above.

The Use of the Binder Composition

The invention is also directed to the use of the binder composition described above for improving the fresh state rheology of wet concrete composition or wet industrial mortar composition in particular tile adhesive, coating, assembling mortars, repair mortars, renders, technical mortars and mortars for floor covering.

Advantageously, for the use according to the invention, the paste fresh state yield stress is comprised between 0 Pa and 200 Pa, advantageously between 5 Pa and 100 Pa and more advantageously between 10 Pa and 50 Pa.

Advantageously, for the use according to the invention, the paste fresh state viscosity is comprised between 0 Pa·s and 5 Pa·s, advantageously between 0.1 Pa·s and 3 Pa·s and more advantageously between 0.25 Pa·s and 1.5 Pa·s.

The invention is also directed to the use of the binder composition described above for the preparation of precast or ready-mix concrete.

EXAMPLES

Example 1: The Synergistic Effect of the Particle Size Distribution of the Filler Particles and the GGBS Particles Four mortars were prepared following to the mixing protocol and specimen size according to standard NF EN 196-1. The compressive strengths of these mortars have been determined according to standard NF EN 196-1. The compositions and the compressive strength are set forth in table 1 below.

TABLE 1

| | | CE1 | CE2 | CE3 | E1 |
|---|---|---|---|---|---|
| Component a (dry weight %): Portland cement | | 15 | 15 | 15 | 15 |
| Component b (dry weight %) | Standard GGBS ($d_{50}$ = 10 μm) | 22.5 | 22.5 | 12.5 | 12.5 |
| | Ultrafine GGBS ($d_{50}$ < 2.5 μm) | 0 | 0 | 10 | 10 |
| Component c (dry weight %) | Fine limestone filler ($d_{50}$ < 3 μm) | 0 | 10 | 0 | 10 |
| | Standard Limestone filler ($d_{50}$ = 12 μm) | 62.5 | 52.5 | 62.5 | 52.5 |
| Normalized sand (0-1 mm) to components a, b and c weight ratio | | 2.25 | 2.25 | 2.25 | 2.25 |
| Water to components a, b and c weight ratio | | 0.25 | 0.25 | 0.25 | 0.25 |
| Component d (dry weight % relative to components a, b and c total weight) $CaSO_4$ | | 2 | 2 | 2 | 2 |
| Component e (dry weight % relative to components a, b and c total weight) | | 1 | 1 | 1 | 1 |
| Component f (dry weight % relative to components a, b and c total weight): $Ca(NO_3)_2$ $4H_2O$ | | 1 | 1 | 1 | 1 |
| Compressive strength after 24 hours (MPa) | | 10.1 | 11.1 | 14.3 | 15.7 |
| Compressive strength after 28 days (MPa) | | 61.3 | 66.5 | 69.2 | 72.7 |

As can be seen from table 1, the compressive strengths of the mortar containing standard limestone filler and standard GGBS (CE1) are lower than the mortars comprising either ultrafine limestone filler (CE2) or ultrafine GGBS (CE3). The mortar combining both ultrafine limestone filler and ultrafine GGBS (E1) has compressive strength greater than mortars of CE2 and CE3, showing a synergistic effect of the combination of ultrafine limestone filler and ultrafine GGBS.

Example 2: Effect of the Quantity of Ultrafine GGBS

One additional mortar was prepared following to the mixing protocol and specimen size according to standard NF EN 196-1. The compressive strengths of this mortar have been determined according to standard NF EN 196-1. The compositions and the compressive strength are set forth in table 2 below in which example E1 is reproduced.

TABLE 2

| | | E1 | E2 |
|---|---|---|---|
| Component a (dry weight %): Portland cement | | 15 | 15 |
| Component b (dry weight %) | Standard GGBS ($d_{50}$ = 10 μm) | 12.5 | 8.5 |
| | Ultrafine GGBS ($d_{50}$ < 2.5 μm) | 10 | 14 |
| Component c (dry weight %) | Fine limestone filler ($d_{50}$ < 3 μm) | 10 | 10 |
| | Standard Limestone filler ($d_{50}$ = 12 μm) | 52.5 | 52.5 |
| Normalized sand (0-1 mm) to components a, b and c weight ratio | | 2.25 | 2.25 |
| Water to components a, b and c weight ratio | | 0.25 | 0.25 |
| Component d (dry weight % relative to components a, b and c total weight) $CaSO_4$ | | 2 | 2 |
| Component e (dry weight % relative to components a, b and c total weight) | | 1 | 1 |
| Component f (dry weight % relative to components a, b and c total weight): $Ca(NO_3)_2$ $4H_2O$ | | 1 | 1 |
| Compressive strength after 24 hours (MPa) | | 15.7 | 18.7 |
| Compressive strength after 28 days (MPa) | | 72.7 | 74.9 |

As can be seen from table 2, the compressive strengths of the mortar E2, comprising more ultrafine GGBS are greater than the compressive strengths of the mortar E1.

Example 3: Effect of Ultrafine Cement

Five additional mortars were prepared according to standard NF EN 196-1. The compressive strengths after 24 h of these mortars have been determined according to standard NF EN 196-1. The compositions and the compressive strength are set forth in table 3 below in which example E1 is reproduced.

TABLE 3

| | | E1 | E3 | E4 | E5 | E6 | E7 |
|---|---|---|---|---|---|---|---|
| Component a (dry weight %) | Portland cement | 15 | 13 | 10 | 7 | 4 | 0 |
| | Ultrafine Portland cement ($d_{50}$ ≤ 3.5 μm) | 0 | 2 | 5 | 8 | 11 | 15 |
| Component b (dry weight %) | Standard GGBS ($d_{50}$ = 10 μm) | 12.5 | 12.5 | 12.5 | 12.5 | 12.5 | 12.5 |
| | Ultrafine GGBS ($d_{50}$ < 2.5 μm) | 10 | 10 | 10 | 10 | 10 | 10 |
| Component c (dry weight %) | Fine limestone filler ($d_{50}$ < 3 μm) | 10 | 10 | 10 | 10 | 10 | 10 |
| | Standard Limestone filler ($d_{50}$ = 12 μm) | 52.5 | 52.5 | 52.5 | 52.5 | 52.5 | 52.5 |
| Normalized sand (0-1 mm) to components a, b and c weight ratio | | 2.25 | 2.25 | 2.25 | 2.25 | 2.25 | 2.25 |
| Water to components a, b and c weight ratio | | 0.25 | 0.25 | 0.25 | 0.25 | 0.25 | 0.25 |
| Component d (dry weight % relative to components a, b and c total weight) $CaSO_4$ | | 2 | 2 | 2 | 2 | 2 | 2 |
| Component e (dry weight % relative to components a, b and c total weight) | | 1 | 1 | 1 | 1 | 1 | 1 |
| Component f (dry weight % relative to components a, b and c total weight): $Ca(NO_3)_2$ $4H_2O$ | | 1 | 1 | 1 | 1 | 1 | 1 |
| Compressive strength after 24 hours (MPa) | | 15.7 | 14.6 | 16.3 | 17.2 | 20.7 | 23.6 |

As can be seen from table 3, despite an insignificant decrease with the replacement of about 13% by weight of standard Portland cement by ultrafine Portland cement (E3), it can be concluded that the compressive strength of the mortars according to the invention increased along with the increase in the replacement ratio of standard Portland cement by ultrafine Portland cement.

The invention claimed is:

1. A binder composition comprising:

a. between 1% and 30% in dry weight of at least one lime source;

b. between 5% and 75% in dry weight of ground granulated blast furnace slag;

c. between 20% and 90% in dry weight of at least one filler;

d. between 0.1% and 5% in dry weight, relative to the total weight of components a, b and c, of $SO_3^-$;

e. between 0.1% and 1% in dry weight, relative to the total weight of components a, b and c, of at least one water reducer polymer;

f. between 0% and 2% in dry weight, relative to the total weight of components a, b and c, of at least one activator different from d.;

said ground granulated blast furnace slag being a particles mixture of:

between 10% and 100% in weight, in respect with the total weight of the ground granulated blast furnace slag, of particles having a $d_{50}$ greater than or equal to 1 μm and strictly less than 5 μm, between 0% and 90% in weight, in respect with the total weight of the ground granulated blast furnace slag, of particles having a $d_{50}$ greater than or equal to 5 μm, said filler being a particles mixture of:

between 10% and 90% in weight, in respect with the total weight of the filler, of particles having a $d_{50}$ greater than or equal to 0.05 μm and strictly less than 8 μm, and between 10% and 90% in weight, in respect with the total weight of the filler, of particles having a $d_{50}$ greater than or equal to 8 μm and strictly less than 200 μm, measurement of $d_{50}$ being done by Laser diffraction analysis, by means of Laser diffraction analyzer with a humid way method.

2. The binder composition according to claim 1, wherein the lime source is Portland cement or lime.

3. The binder composition according to claim 1, wherein the lime source is Portland cement, at least a portion of which being ultrafine cement having a $d_{50}$, lower than or equal to 8 μm, measurement of $d_{50}$ being done by Laser diffraction analysis, by means of Laser diffraction analyzer with the humid way method.

4. The binder composition according to claim 1, wherein the filler is a natural material.

5. The binder composition according to claim 1, wherein the $SO_3^-$ is from sodium sulfate, potassium sulfate, calcium sulfate, anhydride sulfate, or mixture thereof.

6. The binder composition according to claim 1, wherein the water reducing polymer is selected from the group consisting of lignosulfonate polymers, melamine sulfonate polymers, naphthalene sulfonate polymers, polycarboxylic acid ether polymers, polyoxyethylene phosphonates, vinyl copolymers, and mixtures thereof.

7. The binder composition according to claim 1, wherein the activator different from d is an alkaline metal salt.

8. A dry concrete composition or dry industrial mortar composition comprising at least one aggregate and the binder composition according to claim 1.

9. A wet concrete composition or wet industrial mortar composition comprising at least one aggregate, the binder composition according to claim 1 and water.

10. A hardened concrete composition or hardened industrial mortar composition obtained from the wet concrete composition or wet industrial mortar composition according to claim 9.

11. A process for preparing the wet concrete composition or the wet industrial mortar composition according to claim 9 comprising a step of mixing with water, at least one aggregate and a binder composition comprising:

a. between 1% and 30% in dry weight of at least one lime source;

b. between 5% and 75% in dry weight of ground granulated blast furnace slag;

c. between 20% and 90% in dry weight of at least one filler;

d. between 0.1% and 5% in dry weight, relative to the total weight of components a, b and c, of $SO_3^-$;

e. between 0.1% and 1% in dry weight, relative to the total weight of components a, b and c, of at least one water reducer polymer;

f. between 0% and 2% in dry weight, relative to the total weight of components a, b and c, of at least one activator different from d;

said ground granulated blast furnace slag being a particles mixture of:

between 10% and 100% in weight, in respect with the total weight of the ground granulated blast furnace slag, of particles having a $d_{50}$ greater than or equal to 1 μm and strictly less than 5 μm, between 0% and 90% in weight, in respect with the total weight of the ground granulated blast furnace slag, of particles having a $d_{50}$ greater than or equal to 5 μm, said filler being a particles mixture of:

between 10% and 90% in weight, in respect with the total weight of the filler, of particles having a $d_{50}$ greater than or equal to 0.05 μm and strictly less than 8 μm, and between 10% and 90% in weight, in respect with the total weight of the filler, of particles having a $d_{50}$ greater than or equal to 8 μm and strictly less than 200 μm, measurement of $d_{50}$ being done by Laser diffraction analysis by means of Laser diffraction analyzer with a humid way method, the binder composition being prepared before the mixing step or in situ during the mixing step from at least some of the components a) to f) of the binder composition taken separately and/or under a form of premix(es).

12. The process according to claim 11, wherein a ratio water to binder composition is comprised between 0.1 and 0.5.

* * * * *